Figure 1:
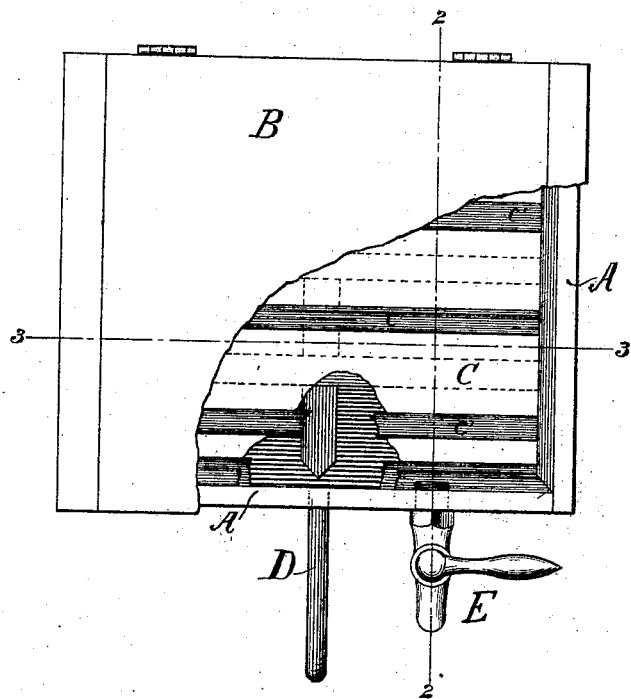

J. W. HYATT & J. G. JARVIS.
Apparatus for Washing Paper-Pulp.

No. 210,612.  Patented Dec. 10, 1878.

WITNESSES
Wm A Skinkle
Geo W Breck.

INVENTORS
John W. Hyatt and J. G. Jarvis,
By their Attorneys
Baldwin, Hopkins & Peyton

UNITED STATES PATENT OFFICE.

JOHN W. HYATT AND JOHN G. JARVIS, OF NEWARK, N. J., ASSIGNORS TO THE CELLULOID MANUFACTURING COMPANY, OF NEW YORK, N. Y.

IMPROVEMENT IN APPARATUS FOR WASHING PAPER-PULP.

Specification forming part of Letters Patent No. 210,612, dated December 10, 1878; application filed August 8, 1878.

*To all whom it may concern:*

Be it known that we, JOHN W. HYATT and JOHN GEORGE JARVIS, both of Newark, in the county of Essex and State of New Jersey, have jointly invented certain new and useful Improvements in Processes for Washing Paper-Pulp, and in apparatus for the conduct of such processes, of which improvements the following is a specification:

Our invention relates most immediately to the treatment of nitro-cellulose, or the product obtained by subjecting vegetable fiber to the action of nitric or nitric and sulphuric acids, as is well understood.

The fiber thus converted into nitro-cellulose is used for various purposes, and, when mixed with certain other ingredients, forms compounds susceptible of use in the plastic arts. Of these plastic compounds, those comprised under the now well-known designation of "celluloid" are obtained by employing the nitro-cellulose or converted fiber in a granulated state, to which state it is reduced by means of the ordinary beating or pulping engines.

Even when the fiber to be converted has been previously bleached, it becomes more or less discolored during the converting process and the pulping process, so that, before employing it in the manufacture of celluloid, the granulated nitro-cellulose requires to be bleached again, and afterward very thoroughly washed, so as to remove all the acids or bleaching agents or salts that would otherwise be detrimental to its quality and use as soluble fiber.

We found that the ordinary processes of washing converted fiber in the form in which it had usually been made were not adapted to the proper washing of granulated nitro-cellulose, as it was liable to waste in considerable quantities by passing off on the surface of the water or through the bottom of the washing-tank, and liable to pack and become lumpy under the pressure of water passed down through it.

It is accordingly the object of our improvements to thoroughly remove from the granulated nitro-cellulose all chemical impurities by simple washing in water, without drawing off or floating off the fiber, and without packing or matting it; and to these ends our invention consists in providing the washing tank or vat with a false bottom, consisting of flannel cloth or other similar material pervious to water, but not open enough for the granules of fiber to pass through it, and maintaining a circulation of water from below upward and from above downward through this false bottom and through the granulated fiber in the tank, so as to hold the granules suspended in the vertical currents, maintaining a circulation so active as to not only thoroughly agitate and wash the granulated fiber, but also to thoroughly cleanse the pores of the filtering-bottom and prevent it from clogging, without permitting the granules of the fiber to escape or to be carried off.

It is manifest that this invention is available for washing various substances; and we do not mean to confine our claims to the treatment of granulated nitro-cellulose, although, as already indicated, our improvements are specially adapted to this use, and we shall describe them as applied in the preparation of ground soluble fiber for the manufacture of celluloid.

Figure 2:
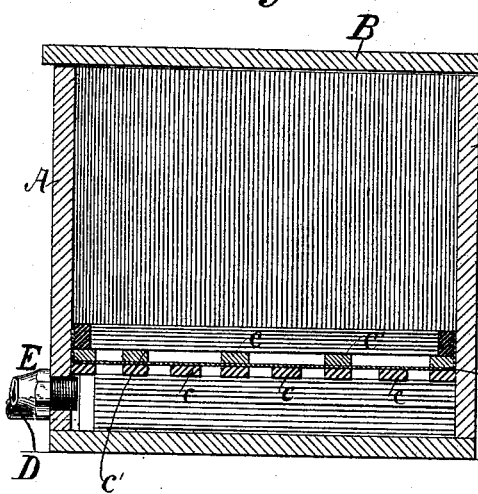
Figure 3:
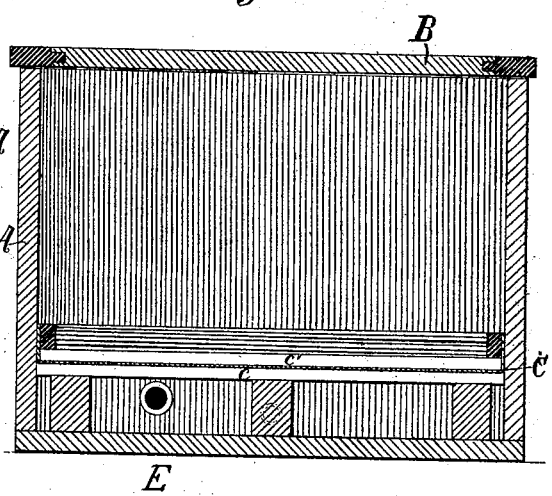

In the accompanying drawings, which form part of this specification, Figure 1 is a plan or top view of our improved washing-tank, with a portion of the top or cover broken away to show the arrangement of the filtering-bottom, and a portion of the filtering-bottom torn away to show the arrangement underneath it. Fig. 2 is a vertical transverse section through the washing-tank at the line 2 2 of Fig. 1; and Fig. 3 is a similar section at right angles to that shown in Fig. 2—to wit, on the line 3 3 of Fig. 1.

The washing-tank A is a box of any suitable water-tight construction, having a lid or cover, B, tightly closing it, and a false bottom, C, of flannel or other porous material, supported at intervals on transverse slats $c$ $c$, and held down at intervals by cross-slats $c'$ $c'$, so that the web is kept flat and not allowed to sag, or to be unduly moved up and down under the weight of the pulp or the flow of the water.

An inlet-pipe, D, admits the fresh water under proper pressure into the tank A, below the false bottom C; and an outlet-pipe, E, on a somewhat higher level than the inlet-pipe, but also below the bottom C, carries off the drainage-water that filters down through the bottom C. The pores or meshes of the bottom C are not so close as to prevent a free circulation of the water upward and downward through them; but are not open enough to permit the granules of the fiber to pass through them with the drainage-water.

The pulp or granulated fiber is taken from the beating-engine to the bleaching-vat, and there subjected to treatment which forms no part of the invention herein claimed. From the bleaching-vat the granulated fiber is transferred into the washing-tank A, and deposited upon the false bottom C, where it may be allowed to drain off before fresh water is admitted; or the fresh water may be immediately turned on through the inlet-pipe D, and, passing up through the filter or false bottom C, it will gradually lift the granulated fiber, separating the particles, and actively moving them about and turning them over and thoroughly washing them. The downward current induced through the outlet-pipe E will also further agitate and scour the granules of the fiber and carry off impurities extracted from the mass, until the drainage-water will be found free from color or other indications of impurity, or until the ordinary tests show the fiber to be perfectly washed, when the inlet-pipe D is closed, and, the water still flowing off through the pipe E, the washed fiber will gradually settle down upon the bottom C as the outflowing water filters through it, and the moisture will gradually drain off without packing or caking the fiber, which is then ready to have the other ingredients mixed with it, as is well understood.

If it should be found that the filtering-bottom C has become clogged by fine particles of fiber or other accretions after the washed fiber has been removed, the water may be again turned on through the pipe D, and allowed to run off quickly, thereby thoroughly opening the pores of the filter for the next charge.

We do not claim, broadly, an upward filter, nor a filtering-bottom of porous or fibrous material; but,

Having thus described the nature and objects of our invention, what we claim as new, and desire to secure by Letters Patent, is—

1. The hereinbefore-described method of washing granulated fiber in induced upward and downward currents flowing through a porous filtering-bottom, substantially as and for the purposes described.

2. The combination of a tightly-closed washing-tank, a false bottom of porous filtering material, an inlet-pipe below the filtering-bottom, and an outlet-pipe, also below the filtering-bottom, substantially as and for the purposes set forth.

JOHN W. HYATT.
JOHN GEO. JARVIS.

Witnesses:
ABRAHAM MANNERS,
R. J. D. DUNN.